Dec. 22, 1953    M. T. SJERSLEE    2,663,135
CUSHIONING MEANS FOR DUMP RAKES
Filed Jan. 27, 1953    2 Sheets-Sheet 1

Maurice T. Sjerslee
INVENTOR.

Dec. 22, 1953　　　M. T. SJERSLEE　　　2,663,135
CUSHIONING MEANS FOR DUMP RAKES
Filed Jan. 27, 1953　　　　　　2 Sheets-Sheet 2

Maurice T. Sjerslee
INVENTOR.

Patented Dec. 22, 1953

2,663,135

UNITED STATES PATENT OFFICE 2,663,135

CUSHIONING MEANS FOR DUMP RAKES

Maurice T. Sjerslee, Braddock, N. Dak.

Application January 27, 1953, Serial No. 333,451

5 Claims. (Cl. 56—27)

This invention relates to new and useful improvements in dump rakes and the primary object of the present invention is to provide a shock absorbing and cushioning means for the hydraulically actuated tine holding bar of a dump rake.

Another important object of the present invention is to provide a spring connected thrust member connected to a dump rake and to the hydraulic cylinder of the rake so that as the cylinder is swung upwardly, in response to the tines of the rake engaging a ground obstruction, the thrust member will cushion upward movement of the tines.

A further object of the present invention is to provide a shock absorbing and cushioning attachment for dump rakes that is quickly and readily applied to or removed from the conventional structure of the rake without in any way interfering with the normal efficient operation of the hydraulic actuator for the tine holding bar.

A still further aim of the present invention is to provide a shock absorber and cushioning attachment of the aforementioned character that is extremely simple and practical in construction, strong and reliable in use, efficient and durable in operation, inexpensive to manufacture, assemble and service and otherwise well adapted for the purposes for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a fragmentary view of Figure 2 and showing the tine holding bar in its raised position;

Figure 1:
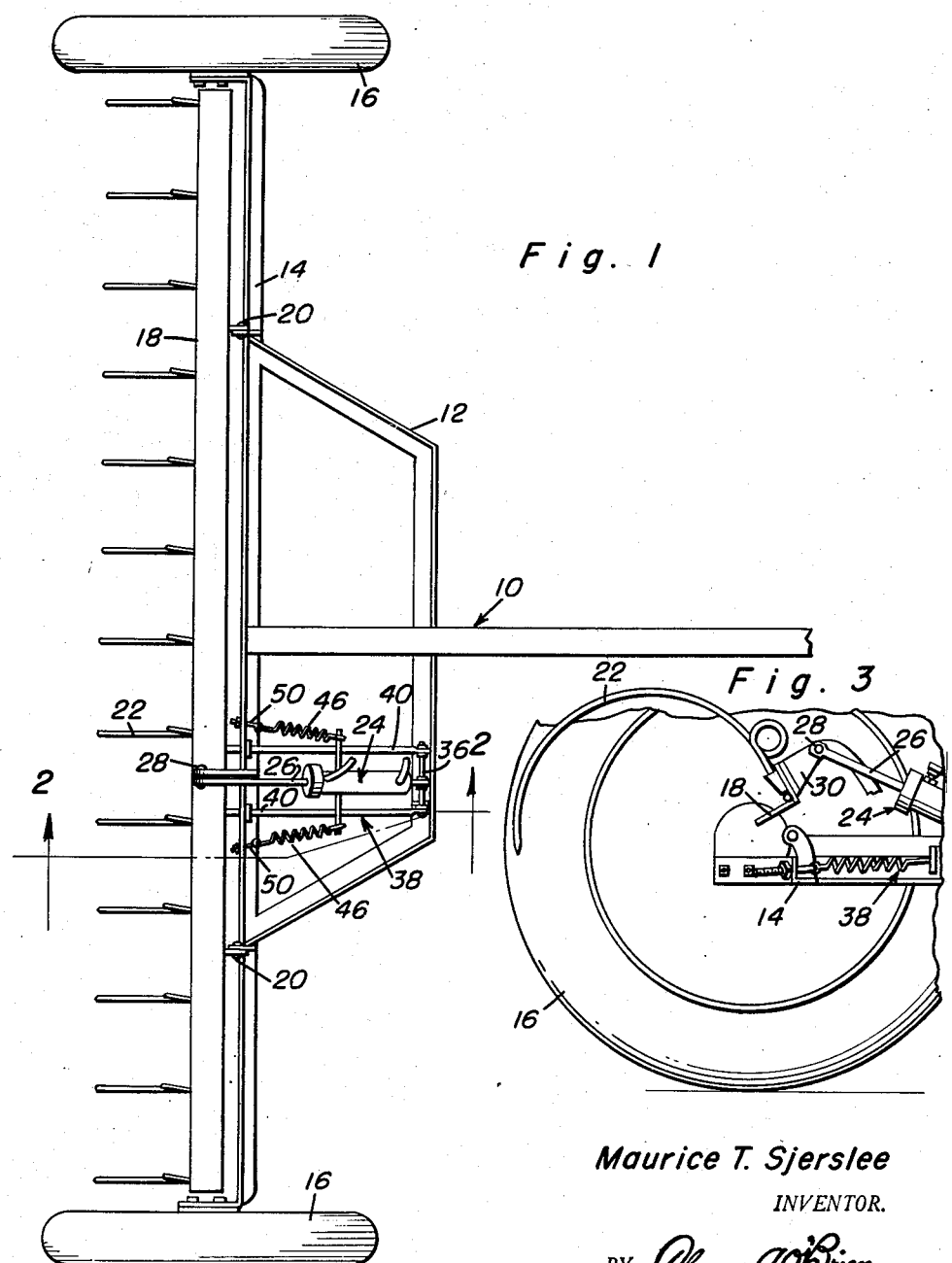
Figure 1 is a top plan view of a dump rake and showing the present invention operatively connected therewith.

Referring now to the drawings in detail, wherein for the purpose of illustration, there is disclosed a preferred embodiment of the present invention, the numeral 10 represents a dump rake including a wheeled frame 12 having a cross-beam 14 whose ends support wheel 16. A tine holding bar 18 parallels the beam 14 and is pivotally attached to the beam 14, as at 20, whereby the bar 18 may be swung upwardly or rearwardly to thereby raise or lower longitudinally spaced tines 22 which are secured to the bar 18.

As is usual for such hydraulically actuated dump rakes, a hydraulic cylinder 24 is provided for imparting swinging motion to the bar 18 to selectively raise or lower the tines 22. The cylinder 24 is operatively connected to the hydraulic lift system of a tractor to which the rake is hitched so that the rearwardly extending rod 26 of the cylinder may be extended or retracted.

Figure 2:
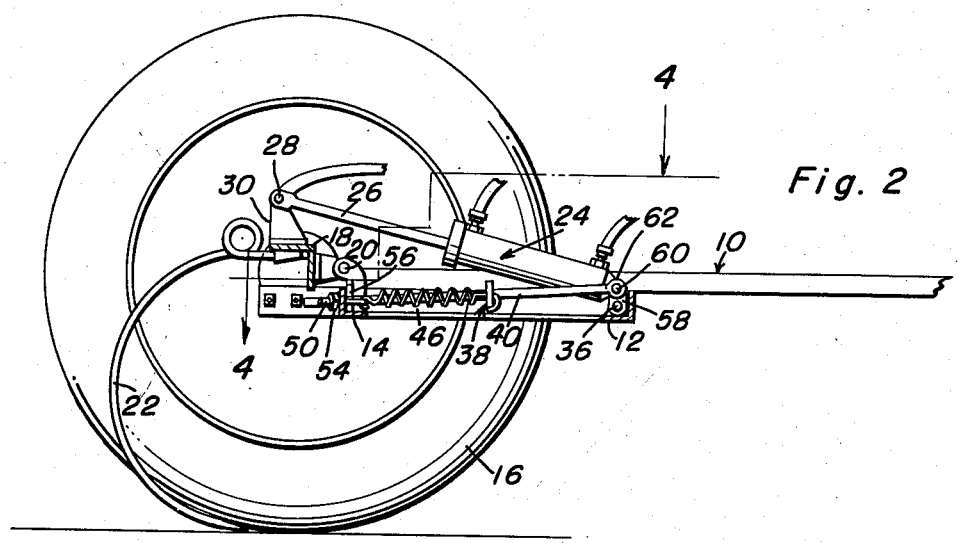
Figure 2 is an enlarged transverse vertical sectional view taken substantially on the plane of broken section line 2—2 of Figure 1 and showing the tine holding bar in its lowered position.
Figure 4:
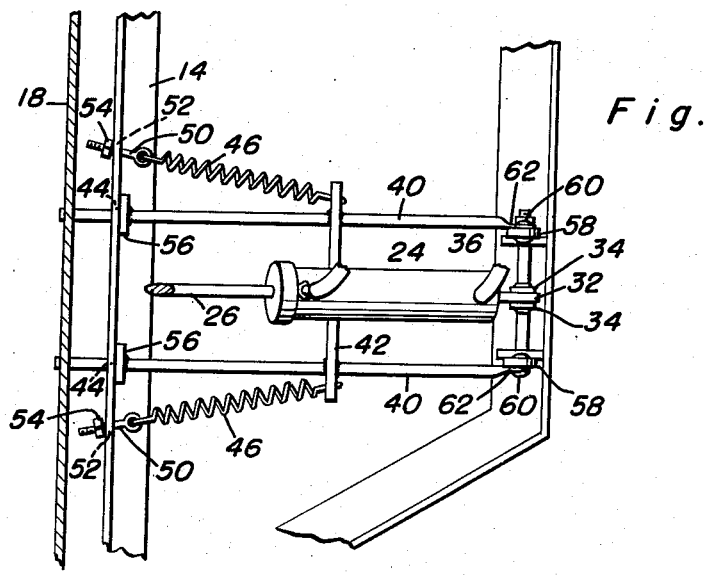
Figure 4 is an enlarged horizontal sectional view taken substantially on the plane of section line 4—4 of Figure 2.
Figure 5:
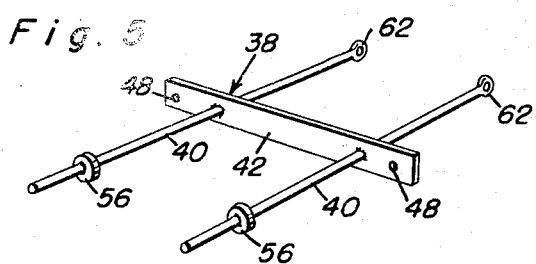
Figure 5 is a perspective view of the thrust member used in the present invention.

The rod 26 of cylinder 24 is pivoted, as at 28, to an arm 30 fixed to and extending upwardly from bar 18 so that the pivot 28 will be disposed above and rearwardly from the pivots 20, as shown in Figure 2. The forward closed end of cylinder 24 is provided with a rigid ear 32 that is pivoted between a pair of upwardly extending ears 34 fixed to a horizontal pivot pin 36 rockably carried by frame 12, so that the cylinder may be swung upwardly and forwardly or downwardly and rearwardly.

The present invention does not attempt to claim the above well-known structure but is merely an attachment therefor that will yieldingly restrict upward swinging movement of the cylinder as the tines 22 engage a ground obstruction and which attachment also yieldingly urges the tines 22 into ground engaging position.

To accomplish the desired results, there is provided a rigid thrust member 38 including a pair of spaced parallel rod elements 40 that are connected by a cross-bar 42. The bar 42 is provided with apertures adjacent its ends in which the rod elements 40 are fixed by welding or the like.

Beam 14 is provided with a pair of spaced apertures 44 that slidably receive the rear end portions of rod elements 40. The forward hook ends of coil spring 46 are engaged in the apertures 48 in the ends of bar 42. The rear ends of the springs 46 are engaged with eye-bolts 50 that extend through apertures 52 in the beam 14. Nuts 54 are threaded on the bolts 50 and engage behind the beam 14 in order to permit slight adjustment of the springs 46. Abutment plates 56 are fixed by welding or the like to the rod elements 40 and are urged against beam 14 by the springs 46 to limit rearward movement of member 38 relative to beam 14.

A pair of upstanding rigid arms or links 58 are fixed to the ends of pin 36. The upper ends of the arms 58 are pivoted, as at 60, to the forward eye ends 62 of the rod elements 40 so that the rod elements will be pulled forwardly as the pin 36 is rotated to swing the arms 58 forwardly.

In practical use of the present invention, the cylinder 24 is initially actuated to extend rod 26 rearwardly and thereby swing the bar 18 and tines 22 to their working position. As the dump rake 10 is pulled forwardly, the tines 22 will frequently engage a ground obstruction. Should this occur, the tines 22 will be swung upwardly and the bar 18 will swing upwardly and rearwardly. As the bar 18 is swung upwardly and forwardly, cylinder 24 will also be swung upwardly and forwardly and pin 36 will be rotated to pull the thrust member 38 forwardly against action of the springs 46 which cushion the upward movement of the tines 22.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a dump rake including a wheeled frame, a tine holding bar pivotally attached to said frame, tines carried by said bar and a hydraulic cylinder operatively connecting the bar to the frame for pivoting the bar to selectively raise and lower the tines; the improvement of which comprises a cushioning device between the frame and the bar yieldingly restricting upward movement of the tines, said cushioning device comprising a rigid thrust member having a forward portion pivoted to the frame and a rear portion slidably engaging the frame, spring means connecting the thrust member to the frame and yieldingly urging the thrust member rearwardly, and means connecting the forward portion of said thrust member to the cylinder to impart sliding movement to the thrust member in response to swinging of said cylinder.

2. In a dump rake including a wheeled frame, a tine holding bar pivotally attached to said frame, tines carried by said bar and a hydraulic cylinder operatively connecting the bar to the frame for pivoting the bar to selectively raise and lower the tines; the improvement of which comprises a cushioning device between the frame and the bar yieldingly restricting upward movement of the tines, said cushioning device comprising a rigid thrust member having a forward portion pivoted to the frame and a rear portion slidably engaging the frame, spring means connecting the thrust member to the frame and yieldingly urging the thrust member rearwardly, a horizontal pivot pin carried by the frame and engaging the cylinder, a pair of rigid arms fixed to said pin and pivoted to the forward end of said thrust member to impart forward sliding movement to the thrust member as the cylinder is swung upwardly.

3. In a dump rake including a wheeled frame, a tine holding bar pivoted to the frame, tines carried by said bar, and a hydraulic cylinder having a closed end pivoted to the frame in front of the bar and a rearwardly extending piston rod pivoted to the bar, said cylinder being actuated to pivot said bar for selectively raising and lowering said tines; the improvement of which comprises a shock absorber yieldingly restricting pivoting of said bar to a tine raising position as the cylinder is swung upwardly and forwardly in response to the tines engaging a ground obstruction, said shock absorber comprising a thrust member having a rear end slidably engaging the frame, spring means connecting the thrust member to the frame and yieldingly urging the thrust member rearwardly, and means operatively connecting the forward end of the thrust member to the pivot for the cylinder whereby the thrust member will be pulled forwardly as the cylinder swings upwardly.

4. In a dump rake including a wheeled frame, a tine holding bar pivoted to the frame, tines carried by said bar, and a hydraulic cylinder having a closed end pivoted to the frame in front of the bar and a rearwardly extending piston rod pivoted to the bar, said cylinder being actuated to pivot said bar for selectively raising and lowering said tines; the improvement of which comprises a shock absorber yieldingly restricting pivoting of said bar to a tine raising position as the cylinder is swung upwardly and forwardly in response to the tines engaging a ground obstruction, said shock absorber comprising a pair of parallel rod elements, a cross-bar extending between and fixed to said rod elements, a pair of coil springs having forward ends secured to said cross-bar and rear ends adjustably secured to the frame to urge said rod elements rearwardly, said frame having a pair of apertures slidably receiving said rod elements, a horizontal rotary pivot pin carried by the frame and constituting the means pivotally attaching the forward closed end of the cylinder to the frame, and rigid arms fixed to the pin pivotally attached to the forward ends of said rod elements to pull the rod elements forwardly as the cylinder is swung upwardly and forwardly.

5. In a dump rake including a wheel frame, a tine holding bar pivoted to the frame, tines carried by said bar, and a hydraulic cylinder having a closed end pivoted to the frame in front of the bar and a rearwardly extending piston rod pivoted to the bar, said cylinder being actuated to pivot said bar for selectively raising and lowering said tines; the improvement of which comprises a shock absorber yieldingly restricting pivoting of said bar to a tine raising position as the cylinder is swung upwardly and forwardly in response to the tines engaging a ground obstruction, said shock absorber comprising a pair of parallel rod elements, a cross-bar extending between and fixed to said rod elements, a pair of coil springs having forward ends secured to said cross-bar and rear ends adjustably secured to the frame to urge said rod elements rearwardly, said frame having a pair of apertures slidably receiving said rod elements, a horizontal rotary pivot pin carried by the frame and constituting the means pivotally attaching the forward closed end of the cylinder to the frame, a pair of ears fixed to said pin and pivoted to the closed end of said cylinder, and a pair of rigid arms fixed to the ends of said pin and pivoted to the forward ends of said rod elements to impart forward sliding movement to said rod elements as the pin is rotated during upward and forward swinging movement of said cylinder.

MAURICE T. SJERSLEE.

No references cited.